United States Patent [19]

Fannin

[11] Patent Number: 4,549,888
[45] Date of Patent: Oct. 29, 1985

[54] AUTOMATIC CONTROL FOR AN EXTERNAL AIR SUPPLY

[75] Inventor: Richard C. Fannin, Grafton, Ohio
[73] Assignee: Allied Corporation, Morristown, N.J.
[21] Appl. No.: 669,158
[22] Filed: Nov. 7, 1984
[51] Int. Cl.⁴ .............................................. B01D 53/04
[52] U.S. Cl. ............................................ 55/163; 55/21
[58] Field of Search ..................... 55/21, 33, 161, 163; 303/71, 85

[56] References Cited

U.S. PATENT DOCUMENTS

| | | | |
|---|---|---|---|
| 3,080,693 | 3/1963 | Glass et al. | 55/163 |
| 3,572,008 | 3/1971 | Hankison et al. | 55/33 |
| 3,937,622 | 2/1976 | Hewitt et al. | 55/163 |
| 4,119,355 | 10/1978 | Kreitner | 303/85 |

*Primary Examiner*—Charles Hart
*Attorney, Agent, or Firm*—Ken C. Decker; William N. Antonis

[57] ABSTRACT

A vehicle air brake system includes a conventional automotive air compressor operated by the vehicle engine for charging a storage reservoir with compressed air. Air is communicated through an air dryer which cleans and dries the air before it is communicated to the storage reservoir. A governor is responsive to the pressure level in the storage reservoir to generate a pressure control signal in response to the pressure level in the reservoir reaching a predetermined level. The compressor is unloaded by the signal from the governor so that, while it may continue to be operated by the vehicle engine, it does not compress air. The unloading signal also opens the purge valve on the air dryer, which backflows a quantity of air through the air dryer to regenerate the desiccant. A connector is provided to connect the air brake system with an external shop air supply, so that the reservoir may be kept charged while the vehicle is parked so that the vehicle may be moved immediately after the vehicle engine is started. The connector is communicated to the supply or inlet port of a conventional inversion valve, which normally permits communication between the supply and delivery ports thereof. The delivery port of the inversion valve is communicated through the air dryer to the storage reservoir. The inversion valve is responsive to the signal from the governor to terminate communication between the supply and delivery ports, and to vent the delivery port to atmosphere.

8 Claims, 1 Drawing Figure

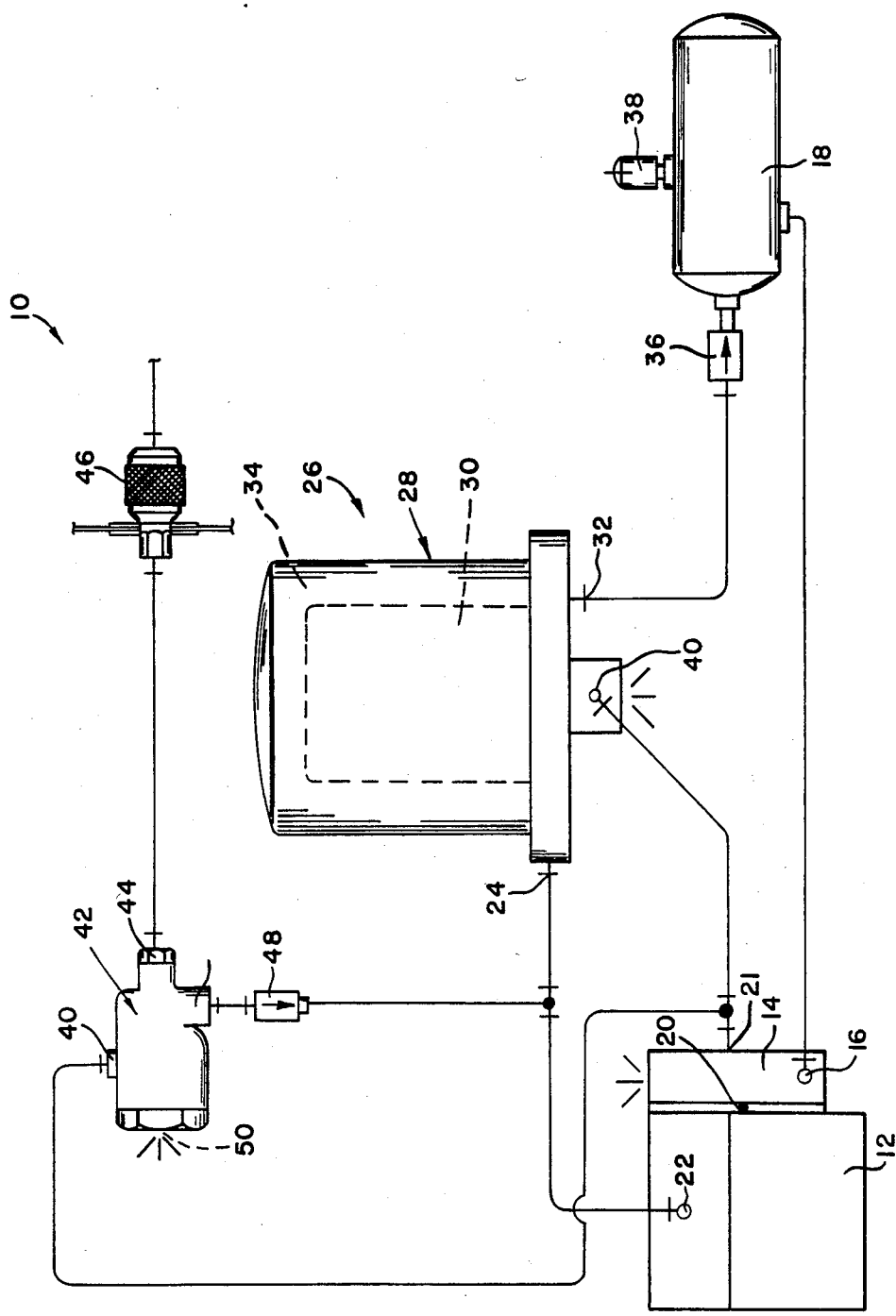

AUTOMATIC CONTROL FOR AN EXTERNAL AIR SUPPLY

This invention relates to an automatic control mechanism for a vehicle air brake system which may be charged from an external air supply.

Fire trucks, and other emergency vehicles such as those used at airports and military installations, all require the ability to depart immediately after the vehicle engine is started and without waiting for the vehicle air compressor to charge the air brake storage reservoir. Since vehicle air brake systems require a finite time period to charge the storage reservoir before the vehicle may be moved, it is necessary to provide a mechanism to charge the air storage reservoirs as quickly as possible. Commonly, emergency equipment of this type is supplied with a "rapid buildup" system, but the rapid buildup system still requires at least thirty seconds from the time that the engine is started to the time that the vehicle may be moved. Accordingly, many fire departments have installed shop air lines to keep the brake system charged at all times. In many fire departments, particularly those in rural areas, this shop air line may be coupled to the air brake system continuously for days or weeks.

The aforementioned shop air source is typically connected directly to the air pressure storage reservoirs mounted on the vehicle, which are normally charged by the automotive air compressor operated by the vehicle engine. Typically, shop air supplied in such a system is loaded with moisture. Many braking systems of this type eventually develop slow leaks, so that there is always flow of air into the reservoirs from the shop air system. Because the shop air is loaded with moisture, the condensate accumulation in the storage reservoirs over a week or more is often considerable. Although many vehicles equipped with air brakes are also equipped with air dryers, the accumulation of moisture in the reservoir negates the benefit of air dryers installed on the vehicles to prevent condensate. Some fire departments may attempt to solve this problem by communicating the shop air source directly to the vehicle air dryer, which is communicated to the storage reservoirs. However, if this is done, the moisture-laden shop air quickly saturates the air dryer desiccant cartridge. Typically, the air dryer cartridge will become so saturated that it will never recover, despite the cyclical purging inherent in air dryer use when the vehicle is operated. Even if the shop air supply is connected to the air dryer, the reservoir will still fill with condensate once the cartridge is saturated. Furthermore, typical shop air sources have system pressures of 150 psi or more, far greater than the pressures normally used in vehicle air brake systems. While the air brake system components are designed to function at this high pressure, the effect of the sustained high pressure increases wear of these components.

Accordingly, one advantage of the air brake system disclosed in the present application is that the vehicle air brake system is automatically charged from a shop air source to a predetermined pressure level compatible with normal air brake pressures. Another advantage of the present invention is that the shop air source is cycled through the vehicle air dryer so that cleaned and dried air is supplied to the storage reservoirs, and the air dryer is purged in its normal purge cycle even while the vehicle is connected to the shop air source. Still another advantage of the invention is that pressure in the air brake system is maintained within the normal predetermined pressure range despite minor leaks in the system.

These and other features of the present invention will be apparent from the following description, with reference to the accompanying drawing, the sole figure of which is a schematic illustration of a partial air brake system incorporating the automatic control made pursuant to the teachings of the present invention.

Referring now to the drawing, the air brake system generally indicated by the numeral 10 includes a conventional air compressor illustrated schematically as at 12 which is operated by the vehicle engine (not shown) during normal operation of the vehicle. A conventional governor 14 is mounted on the air compressor 12. The governor 14 includes a control port 16 which is communicated to the pressure level at a supply or storage reservoir 18. The pressure stored in the storage reservoir 18 is used during operation of the vehicle to operate the vehicle air brakes and other air-actuated appliances carried on the vehicle. Since the remainder of the air brake system and the aforementioned appliances are all conventional, they will not be described in detail herein. The governor 14 is conventional, and responds to the pressure level at the port 16 thereof to provide an unloading signal from its delivery port 20 to the compressor 12 during operation of the vehicle which "unloads" the compressor when the storage reservoir 18 is charged, normally by holding the inlet valves in the compressor open so that, even though the compressor is operated by the vehicle engine, it does not compress air. This unloading signal generated by the governor 14 is also supplied to the outlet port 20 thereof.

The air compressor 12 is also provided with an outlet port 22 from which compressed air is communicated during normal operation of the air compressor 12 during use of the vehicle. The outlet port 22 of the compressor 12 is connected to the inlet or supply port 24 of an air dryer generally indicated by the numeral 26. The air dryer 26 may be made pursuant to the teachings of U.S. Pat. No. 3,572,008 of Hankison et al, or of allowed U.S. application Ser. No. 525,186 filed Aug. 22, 1983 of Dienes et al. The air dryer 26 includes a housing 28, which encloses a desiccant canister generally indicated by the numeral 30. Air is communicated from the supply port 24 of the air dryer 26 to the outlet or delivery port 32 thereof by first passing through the desiccant canister 30, which contains a conventional desiccant material, and then into a purge volume 34 which generally surrounds desiccant canister 30. The purge volume 34 is protected by check valves (not shown) as fully described in the aforementioned patent. The outlet port or delivery port 32 of the air dryer 26 is communicated through a one-way check valve 36 into the aforementioned storage reservoir 18. A conventional safety valve 38 is mounted on the storage reservoir 18 to vent pressure in the reservoir 18 if it attains a dangerously high level. The air dryer 26 is further provided with a control port 40 which is communicated to the governor pressure signal at port 20 of governor 14. The air dryer 26 includes mechanism (not shown, but fully disclosed in the aforementioned U.S. Pat. No. 3,572,008) which responds to the governor pressure signal to open the purge volume 34 to atmosphere, thereby backflowing the pressurized air in purge volume 34 back through the desiccant canister 30 to regenerate the desiccant.

The governing pressure signal at outlet port 20 of governor 14 is also communicated to a control port 40 of a conventional inversion valve generally indicated by the numeral 42. The inversion valve 42, in itself, is conventional, having been used in different air brake systems for many years. The supply or inlet port 44 of the inversion valve 42 is communicated to a conventional self-sealing quick disconnect coupling 46, which is mounted on the side of the vehicle and is adapted to be connected to a shop air supply. The outlet or delivery port 46 of the inversion valve 42 is communicated through a conventional one-way check valve 48 to the supply or inlet port 24 of the air dryer 26. The check valve 48 permits communication from the delivery port 46 to the supply port 24, but prevents communication in the reverse direction. The inversion valve 42 further includes an exhaust port 50, which communicates the interior of the valve 42 to ambient atmosphere while closing its communication with coupling 46. As is well known to those skilled in the art, the inversion valve 42 normally communicates the pressure level at the supply port 44 with the delivery port 46 and closes off the exhaust port 50 in the absence of a pressure signal at control port 40, but responds to a pressure level at the control port 40 to communicate the delivery port 46 to the exhaust port 50 and to close off communication between the supply port 44 and the delivery port 46.

In operation, the air compressor 12 is normally operated by the vehicle engine when the vehicle is operated. Accordingly, compressed air generated by the air compressor 12 is communicated out of the delivery port 22 of the air compressor 12 and into the supply or inlet port 24 of the air dryer 26, where it passes through the desiccant canister 30 and out of the outlet port 32 and into the storage reservoir 18. As described hereinabove, the fluid pressure communicated to the storage reservoir 18 is conventionally used to operate the vehicle air brake system. The pressure level in the storage reservoir 18 is communicated to the port 16 of the governor 14. When the pressure level in the reservoir 18 attains a predetermined pressure level, the governor 14 responds by generating an unloading signal which unloads the compressor 12 in the normal manner. This unloading signal is also communicated to the control port 40 of the air dryer 26. The pressure signal at the control port 40 causes the pressure in the purge volume 34 to backflow through the desiccant container and out to atmosphere, thereby removing most of the moisture content of the desiccant, thus regenerating the desiccant.

The foregoing describes operation of the components of the system 10 during normal operation of the vehicle when the air compressor 12 is operated by the vehicle engine. However, the system 10 is also provided with the coupling 46 which enables connection of the air brake system with a shop air supply so that the air brake system may be fully charged at all times, thus eliminating the necessity of building air pressure by the compressor 12 after the vehicle is started. Although a "rapid buildup" system using the air compressor 12 can charge the reservoirs, including the reservoir 18, in a time period of about 30 seconds, this time period is too long for an emergency vehicle. Accordingly, the quick disconnect coupling 46 is mounted on the side of the vehicle, and is adapted to mate with a corresponding coupling (not shown) on the shop air supply. When the shop air supply is connected with the quick disconnect coupling 46 when the vehicle is parked, and assuming that the reservoir 18 is discharged, the shop air supply is communicated through the coupling 46 to the supply port 44 of the inversion valve 42. Since it is assumed that the pressure level in reservoir 18 is relatively low, the pressure level of port 20 of governor 14 will be at substantially atmospheric pressure. Accordingly, the inversion valve 42 is in a condition in which communication to the exhaust port 50 is cut off and the supply port 44 is communciated to the delivery port 46. Fluid communicated to the delivery port 46 is communicated through the check valve 48 to the supply port 24 of the air dryer 26. As described hereinabove, fluid supplied to the supply port 24 of the air dryer 26 is communicated through the desiccant canister 30 where it is cleaned of its moisture and other contaminants. Accordingly, the shop air supply fed through the inlet port 24 to the outlet port 32 of the air dryer 26 is cleaned in the same way that the air communicated from the air compressor 12 is cleaned and dried in normal operation of the unit when the vehicle engine is running. Fluid pressure from either source communicated to the delivery port 32 is communicated into the storage reservoir 18 through check valve 36.

When the pressure level in storage reservoir 18 attains a predetermined level, the governor 14 generates the aforementioned governor pressure signal. However, since the vehicle is parked and the compressor 12 is not running, the pressure signal communicated to the air compressor will have no effect on the dormant compressor. However, the pressure signal at outlet port 20 will be communicated to the control port 40 of the air dryer 26, thereby causing regeneration of the desiccant canister 30 in the same way as the desiccant canister 30 would be regenerated if the air compressor 12 were running. The pressure level at port 20 is also communicated to the control port 40 of the inversion valve 42, where it causes the inversion valve 42 to close communication between the supply port 44 and delivery port 46 and initiate communication between the delivery port 46 and the exhaust port 50. Accordingly, pressure is cut off from the shop air supply because the inversion valve has cut off communication between the supply port 44 and the delivery port 46 thereof. However, even though the delivery port 46 of inversion valve 42 is vented to atmosphere through exhaust port 50, the check valve 48 prevents pressure from backflowing from the system into the delivery port 46 in the event the engine-driven compressor is started. Accordingly, as long as the pressure level in the reservoir 18 exceeds the predetermined pressure level, communication from the shop air supply is cut off and the air dryer 26 is regenerated in the normal fashion. If the pressure level in the storage reservoir 18 drops below the predetermined level, as would be caused, for example, by slow leaks in the remainder of the system when the vehicle is parked for a long period of time as is common in the normal use of fire trucks and other emergency equipment, the governor 14 automatically responds to the reduced pressure level by cutting off the governor pressure signal at port 20. Accordingly, the inversion valve 42 responds to this drop in pressure at the control port 40 thereof to again cut off communication to the exhaust port 50 and to initiate communication between the supply port 44 and the delivery port 46. Of course, the signal to the control port 40 of the air dryer 26 is also removed when the pressure signal at port 20 is removed, thereby again closing the dryer desiccant canister 30 and purge volume 34 to permit fluid communicated to the inlet port 24 thereof from the shop air system to be cleaned and dried in the normal fashion.

I claim:

1. Vehicle air brake system including an air compressor for compressing air, a storage reservoir communicated with the air compressor for storing air compressed by the air compressor, a governor communicated with the reservoir for generating a governing pressure signal to unload said compressor when the pressure level in the storage, reservoir attains a predetermined level, and means for communicating said air brake system to an auxiliary air supply located off of said vehicle to maintain pressure in said storage reservoir when the vehicle is parked, said communicating means including a releasable coupling for connecting with said auxiliary air supply, and control valve means for controlling communication between said coupling and said reservoir and having a supply port communicated with said coupling, a delivery port communicating with said storage reservoir, and a control port communicated with said governing pressure signal to control communication between the supply and delivery ports in response to said governing pressure signal.

2. Vehicle air brake system as claimed in claim 1, wherein said control valve means communicates the supply with the delivery port when the governing pressure signal is not present at said control port, but responds to said governing pressure system to close communication between the supply and delivery ports and venting the delivery port to ambient atmosphere when a pressure signal is present at said control port.

3. Vehicle air brake system as claimed in claim 2, wherein said air brake system includes an air dryer for cleaning and drying the compressed air, said air dryer including a supply port communicated with both said air compressor and the delivery port of said control valve means.

4. Vehicle air brake system as claimed in claim 3, wherein said air dryer includes a housing, a desiccant material within said housing through which said compressed air is communicated, a purge volume for storing a quantity of compressed air, a control port connected to said governing pressure signal for causing said air in said purge volume to flow through said desiccant material, and a delivery port communicated with said storage reservoir.

5. Vehicle air brake system as claimed in claim 4, wherein said communicating means includes a one-way check valve located between the delivery port of the control valve means and the supply port of the air dryer, said one-way check valve permitting communication from the delivery port of the control valve means to the supply port of the air dryer, but preventing communication in the reverse direction.

6. Vehicle air brake system as claimed in claim 2, wherein said communicating means includes a one-way check valve controlling communication through the delivery port of said control valve means to permit communication from the delivery port of the control valve means but to prevent communication into the latter.

7. Vehicle air brake system as claimed in claim 2, wherein said communicating means includes one-way check valve means preventing communication into said delivery port, but permitting communication in the reverse direction.

8. Vehicle air brake system as claimed in claim 3, wherein said communicating means includes a one-way check valve located between the delivery port of the control valve means and the supply port of the air dryer, said one-way check valve permitting communication from the delivery port of the control valve means to the supply port of the air dryer, but preventing communication in the reverse direction.

* * * * *